UNITED STATES PATENT OFFICE.

HERMANN KAST, OF BERLIN, GERMANY.

PROCESS FOR THE PREPARATION OF CATALYTIC SUBSTANCES IN A MINUTELY-DIVIDED STATE.

1,070,138.  Specification of Letters Patent.  Patented Aug. 12, 1913.

No Drawing.  Application filed April 16, 1912.  Serial No. 691,207.

*To all whom it may concern:*

Be it known that I, HERMANN KAST, subject of Germany, residing at Berlin, Germany, have invented new and useful Improvements in Processes for the Preparation of Catalytic Substances in a Minutely-Divided State, of which the following is a specification.

The prepartion of metals and metal oxids in a minutely divided state, in which they are used especially as contact substances for catalytic chemical processes, or as incandescents for gas, or electrical lighting, or as coloring matters, is generally effected by precipitating the metal or the oxid from solutions of the respective metallic salts by means of precipitating or reducing agencies, either direct from the solutions themselves or after having saturated with the same suitable, more or less porous substances of an inorganic or organic nature. The precipitates obtained in such a manner have to be heated mostly in a reducing gas atmosphere. The first process has the disadvantage, that the precipitates separate themselves during the precipitating process in a comparatively coarse crystallic form, the second, that the precipitates slag during the supplementary heating process. It results from both disadvantages, that the surface of the precipitates and consequently the chief condition of their effectiveness is considerably diminished.

The invention aims at overcoming these faults and consists in using as metallic salts the salts of the higher nitrated phenols, particularly trinitrophenol, -kresol, -xylenol, -resorcin, including their substantial products (sulfonic acids, chloro-, acetyl compounds and the like). These salts have the quality of developing, when heated, a large quantity of gases, which on account of their carbonmonoxid-, hydrogen- and carbon hydrogen contents, possess great reducing powers and which by means of their quantity swell the mass during the combustion, in a manner that the resulting ashes (the metal or the metal oxid) remain in an extremely minute divided, voluminous and spongy form. Especially suitable for the above named purpose are the next higher homologous bodies of the trinitrophenol, because the productive capacity of the gases increases with the rising carbon and the falling oxygen content, and the quantity of the gases increases with the rising hydrogen content. Among the metal salts are the salts of the heavy metals the most important ones.

By effecting the heating or the combustion with admission or exclusion of air, one has the option of producing the separation of the metals either as such, or as oxids. A further superiority of the salts consists therein, that the same, when ignited, burn off by themselves, which in the manufacture of incandescents is of particular advantage, as the combustion of the tissue is thereby greatly facilitated. The salts may be used either in a dry state or in more or less diluted solutions, with which the contact carriers are saturated. By evaporating the solutions, precipitates may be separated into layers, the thickness of which may be varied as the character of the catalyzer demands.

The above has the superiority over the processes described in the German Patents 113705 and 134926, the American Patent 612614 and the British Patents 2554 (1906); 7803 (1906), 4956 (1908) on account of its special simplicity, inasmuch as various proceedings, which are required in these patents, such as mixing with other substances (hydrofluoric acid, methyl alcohol, carbohydrates, inorganic and organic salts, metals and the like), glowing, reducing and the like, are effected in a single process, and that the admission of external heat is not required, because the specified salts furnish themselves the necessary heat. For the same reason the new process has a preference before the American Patent 1,001,279, as the hydrogen necessary for reduction of the metallic compound, and the carbondioxid necessary for the preparation of non-pyrophoric metal is not to be conveyed separately, as both gases result spontaneously during combustion. The new process is also more effective than the former ones for the reason, that the beginning is made not from mixtures, but from chemical combinations, which, as is well known, offer such a thorough and minute division of the elements (in a molecular state) as could never be reached by mechanical mixing. For that reason the separation of the effective substance in a most finely divided state is guaranteed. Finally a further advantage must also be admitted, that the process opens the way to a profitable realization of hitherto useless products of the coal industry and the color manufacture.

On account of the great quantities of gas which develop during the separation of the metal or the metal oxid, the process qualifies at the same time for the preparation of porous contact masses, as described in the German Patents No. 102244, 127846, 128554 and 131871, by mixing the aforenamed metal salts with the oxids, hydroxids and the salts of the alkalis, earth alkalis, and heavy metals, by bringing this mixture into a suitable form with or without the help of cements, and then by submitting it to a drying and heating process. Also compared with these processes, particularly with the one described in the German Patent 127846, the new process offers distinct advantages, because the preparation of porous bodies and the coating with the effective substance is brought about in a single process, for on account of the stronger development of gases, a much more porous skeleton is obtained, and because the combustion of the organic salts mentioned in this patent takes place far more slowly and only with admission of external heat.

The danger of an explosion, which exists sometimes, while heating greater quantities of the salts can be avoided by diluting the salts before the heating process with indifferent substances, or by heating the impregnated articles with volatile organic matters, like oils, fats, higher hydrocarbons, in particular paraffin, tar, resins and the like, which at the same time may be used as cements for the preparation of the contact masses in a compact form.

The salts may be used either singly or in a mixture; the combustion can thereby be easily influenced. The same results will be obtained by mixing organic, more or less easily combustible substances with the salts.

In those instances, where a more complete combustion under exclusion of air is intended, and where the separation of free carbon is to be avoided, oxygen carriers (nitrates, chlorates, chromates and the like) are to be added to the salts mentioned or to their mixtures, in such quantities, as will effect the combustion of the carbon contained in the salts to carbonmonoxid. Particularly suitable for this purpose is ammonium nitrate, because this salt burns without leaving any ashes, while developing at the same time great quantities of gases, and because it greatly reduces the fierceness of the combustion. The combustion can for the same purpose also be effected in an atmosphere of carbondioxid or in an atmosphere of steam, where, by reason of the known process of the generator or water gas formation, the carbon oxidizes to carbonmonoxid, while the carbondioxid is reduced to carbonmonoxid. and the existing steam of water is reduced to hydrogen.

Claims for patent:

1. Process for the preparation of catalytic substances in a minutely divided state by heating the heavy metal salts of the trinitrophenols, till the salts burn off by themselves leaving behind their ashes in a very voluminous and spongy form.

2. Process for the preparation of catalytic substances in a minutely divided state by heating the heavy metal salts of the trinitrophenols, till the salts burn off by themselves leaving behind their ashes in a very voluminous and spongy form; effecting the heating in a weakly oxidizing atmosphere of gases.

In testimony whereof I have signed my name to this specification in the presence of two subscribing witnesses.

HERMANN KAST.

Witnesses:
HENRY HASPER,
WOLDEMAR HAUPT.